United States Patent

[11] 3,597,732

[72] Inventor Naoki Morimoto
Tokyo, Japan
[21] Appl. No. 791,675
[22] Filed Jan. 16, 1969
[45] Patented Aug. 3, 1971
[73] Assignee Fujitsu Limited
Kawasaki, Japan
[32] Priority Jan. 18, 1968
[33] Japan
[31] 43/2743

[54] LINE-DETERMINING CIRCUIT FOR PATTERN-INDICATING CIRCUIT

9 Claims, 18 Drawing Figs.

[52] U.S. Cl. 340/146.3 AE
[51] Int. Cl. G06k 9/10
[50] Field of Search 340/146.3

[56] References Cited
UNITED STATES PATENTS

| | | | |
|---|---|---|---|
| 3,142,818 | 7/1964 | Holt | 340/146.3 |
| 3,344,399 | 9/1967 | Bonner | 340/146.3 |

*Primary Examiner*—Maynard R. Wilbur
*Assistant Examiner*—William W. Cochran
*Attorneys*—Curt M. Avery, Arthur E. Wilfond, Herbert L. Lerner and Daniel J. Tick

ABSTRACT: A scanner scans a pattern and supplies to a storage circuit scanning signals in accordance with the pattern. The storage circuit determines the complete continuity and the noncontinuity of specific slope components of the lines of the pattern and the complete termination and the nontermination of such components.

LINE-DETERMINING CIRCUIT FOR PATTERN-INDICATING CIRCUIT

DESCRIPTION OF THE INVENTION

The present invention relates to a pattern-indicating circuit. More particularly, the invention relates to a line-determining circuit for a pattern-indicating circuit. The circuit of the present invention functions to determine only specific lines or strokes of the pattern or character such as, for example, vertical line or stroke components and vertical line or stroke components from lines or strokes having various slopes or inclinations. The determination of the line or stroke components is accomplished with great precision.

The principal object of the present invention is to provide a new and improved line-determining circuit for a pattern-indicating circuit.

An object of the present invention is to provide a line-determining circuit for a pattern-indicating circuit, which line-determining circuit determines the continuity of lines of a pattern with great accuracy and precision.

An object of the present invention is to provide a line-determining circuit for a pattern-indicating circuit, which line-determining circuit is of simple structure and functions with efficiency, effectiveness and reliability, as well as great precision.

In accordance with the present invention, a line-determining circuit in a pattern-indicating circuit for determining the continuity of lines of the pattern. The line-determining circuit comprises scanning means for scanning a pattern comprising a plurality of lines and producing scanning signals in accordance with the pattern. Storage means connected to the scanning means stores the scanning signals and provides from the scanning signals line signals for lines of the pattern having specific slope components. The storage means comprises continuation means for determining the complete continuity and the noncontinuity of the specific slope components of the lines of the pattern, and termination means for determining the complete termination and the nontermination of the specific slope components. Continuation output means is connected to the continuation means of the storage means for indicating the complete continuity and noncontinuity. Termination output means is connected to the termination means of the storage means for indicating the complete termination and nontermination.

The continuation means of the storage means determines the complete continuity and the noncontinuity of the specific slope components of the vertical lines of the pattern and comprises a first shift register having input and output means and comprising a plurality of flip-flops each having a set input, a reset input, a set output and a reset output. The termination means of the storage means determines the complete termination and the nontermination of the specific slope components of the vertical lines of the pattern and comprises a second shift register having input and output means and comprising a plurality of flip-flops each having a set input, a reset input, a set output and a reset output. The storage means comprises a delay line and input means connecting the scanning means to the input means of the first shift register and connecting the scanning means to the input means of the second shift register via said delay line. A first plurality of AND gates each has an output, an input connected to the reset output of a corresponding flip-flop of the first shift register and another input connected to the set output of the corresponding flip-flop of the second shift register. A second plurality of AND gates each has an output, an input connected to the set output of a corresponding flip-flop of the first shift register and another input connected to the set output of a corresponding flip-flop of the first shift register and another input connected to the reset output of the corresponding flip-flop of the second shift register.

The continuation output means comprises a flip-flop having a set input, a reset input, a set output and a reset output and an AND gate having a plurality of inputs and an output connected to the reset input of the flip-flop. The storage means further comprises an AND gate having a plurality of inputs each connected to the output of a corresponding one of the first plurality of AND gates and an output connected to the set input of the flip-flop of the continuation output means and a plurality of inverters each connected between the output of a corresponding one of the first plurality of AND gates and a corresponding one of the inputs of the AND gate of the continuation output means whereby the flip-flop of the continuation output means is set when each of the AND gates of the first plurality of AND gates is in conductive condition and is reset when each of the AND gates of the first plurality of AND gates is in nonconductive condition thereby indicating the complete continuity and the noncontinuity of the specific slope components of the vertical lines of the pattern. Output means is connected to the set output of the flip-flop of the continuation output means.

The termination output means comprises a flip-flop having a set input, a reset input, a set output and a reset output and an AND gate having a plurality of inputs and an output connected to the set input of the flip-flop. The storage means further comprises an AND gate having a plurality of inputs each connected to the output of a corresponding one of the second plurality of AND gates and an output connected to the reset input of the flip-flop of the termination output means and a plurality of inverters each connected between the output of a corresponding one of the second plurality of AND gates and a corresponding one of the inputs of the AND gate of the termination output means whereby the flip-flop of the termination output means is set when each of the AND gates of the second plurality of AND gates is in nonconductive condition and is reset when each of the AND gates of the second plurality of AND gates is in conductive condition thereby indicating the complete termination and the nontermination of the specific slope components of the vertical lines of the pattern. Output means is connected to the set output of the flip-flop of the termination output means.

Each of the first and second shift registers comprises three flip-flops. The delay line has a delay time equal to one scanning period of the scanning means.

In another embodiment of the present invention, the continuation means of the storage means determines the complete continuity and noncontinuity of the specific slope components of the horizontal lines of the pattern and comprises a first shift register having input and output means and comprising a pair of flip-flops each having a set input, a reset input, a set output and a reset output and a second shift register having input and output means comprising a pair of flip-flops each having a set input, a reset input, a set output and a reset output. The termination means of the storage means determines the complete termination and the nontermination of the specific slope components of the horizontal lines of the pattern and comprises the second shift register and a third shift register having input and output means and comprising a pair of flip-flops each having a set input, a reset input, a set output and a reset output. The storage means comprises a first delay line having a first delay time, a second delay line having a second delay time longer than the first delay time, and input means connecting the scanning means to the input means of the first register, connecting the scanning means to the input means of the second shift register via the first delay line and connecting the scanning means to the input means of the third shift register via the second delay line. A first plurality of AND gates each has an output, an input connected to the set output of the first flip-flop of a corresponding one of the shift registers and another input connected to the reset output of the second flip-flop of the corresponding one of the shift registers. A second plurality of AND gates each has an output, an input connected to the reset output of the first flip-flop of a corresponding one of the shift registers and another input connected to the set output of the second flip-flop of the corresponding one of the shift registers.

The continuation output means comprises a circulating-type delay line having a delay time equal to one scanning period, an input and an output, first and second AND gates each having a pair of inputs and an output and an OR gate having a pair of inputs each connected to the output of a corresponding one of the first and second AND gates and an output connected to the input of the circulating-type delay line. The output of the circulating-type delay line is connected to an input of the first AND gate. The storage means further comprises a first AND gate having a plurality of inputs each connected to the output of a corresponding one of the first plurality of AND gates and an output connected to an input of the second AND gate of the continuation output means. A second AND gate has a plurality of inputs and an output. Each of a plurality of inverters is connected between the output of a corresponding one of the first plurality of AND gates and a corresponding input of the second AND gate. An inverter is connected between the output of the second AND gate and the other input of the first AND gate of the continuation output means. The scanning signals are supplied to the other input of the second AND gate of the continuation output means. Output means is connected to the output of the circulating-type delay line.

The termination output means comprises a circulating-type delay line having a delay time equal to one scanning period, an input and an output, first and second AND gates each having a pair of inputs and an output and an OR gate having a pair of inputs each connected to the output of a corresponding one of the first and second AND gates and an output connected to the input of the circulating-type delay line. The output of the circulating-type delay line is connected to an input of the first AND gate. The storage means further comprises a first AND gate having a plurality of inputs each connected to the output of a corresponding one of the second plurality of AND gates and an output connected to an input of the second AND gate of the termination output means. A second AND gate has a plurality of inputs and an output. Each of a plurality of inverters is connected between the output of a corresponding one of the second plurality of AND gates and a corresponding input of the second AND gate. An inverter is connected between the output of the second AND gate and the other input of the first AND gate of the termination output means. The scanning signals are supplied to the other input of the second AND gate of the termination output means. Output means is connected to the output of the circulating-type delay line.

The first delay line has a delay time equal to one scanning period of the scanning means and the second delay line has a delay time equal to two scanning periods of the scanning means.

In order that the present invention may be readily carried into effect, it will now be described with reference to the accompanying drawing, wherein.

Figure 4A:
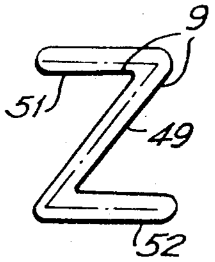
Figure 4B:
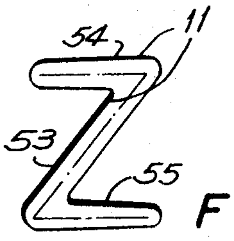
Figure 5A:
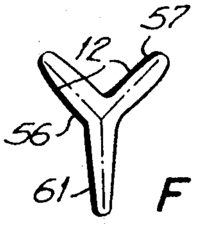
Figure 5B:
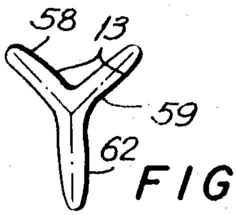
Figure 6:
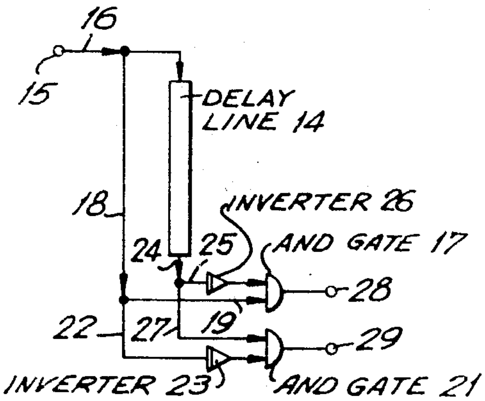
Figure 7:
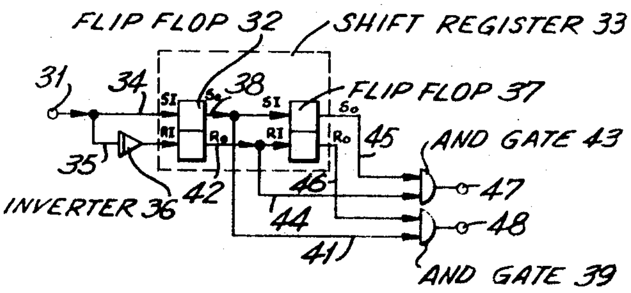
Figure 8A:
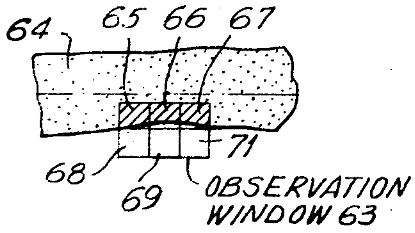
Figure 8B:
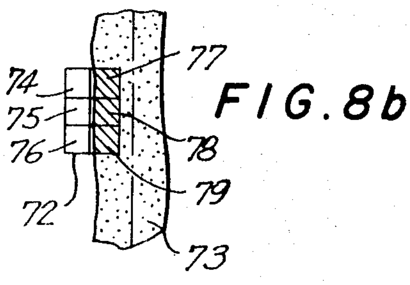
Figure 8C:
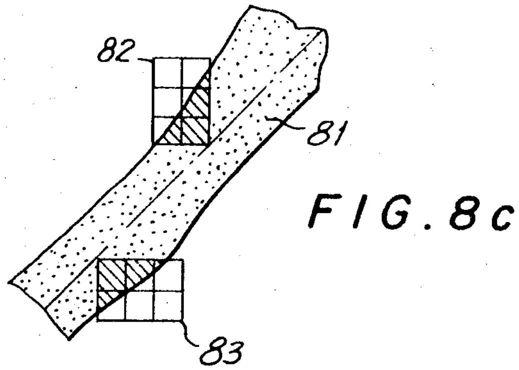
Figure 9A:
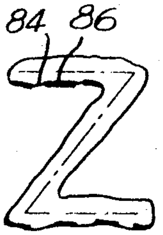
Figure 9B:
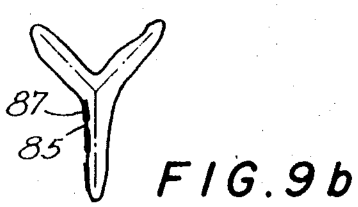
Figure 10A:
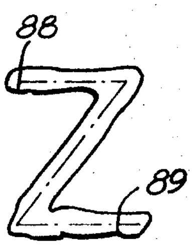
Figure 10B:
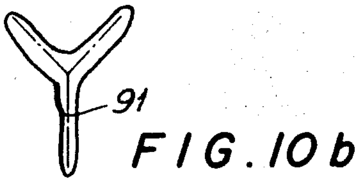
Figure 11:
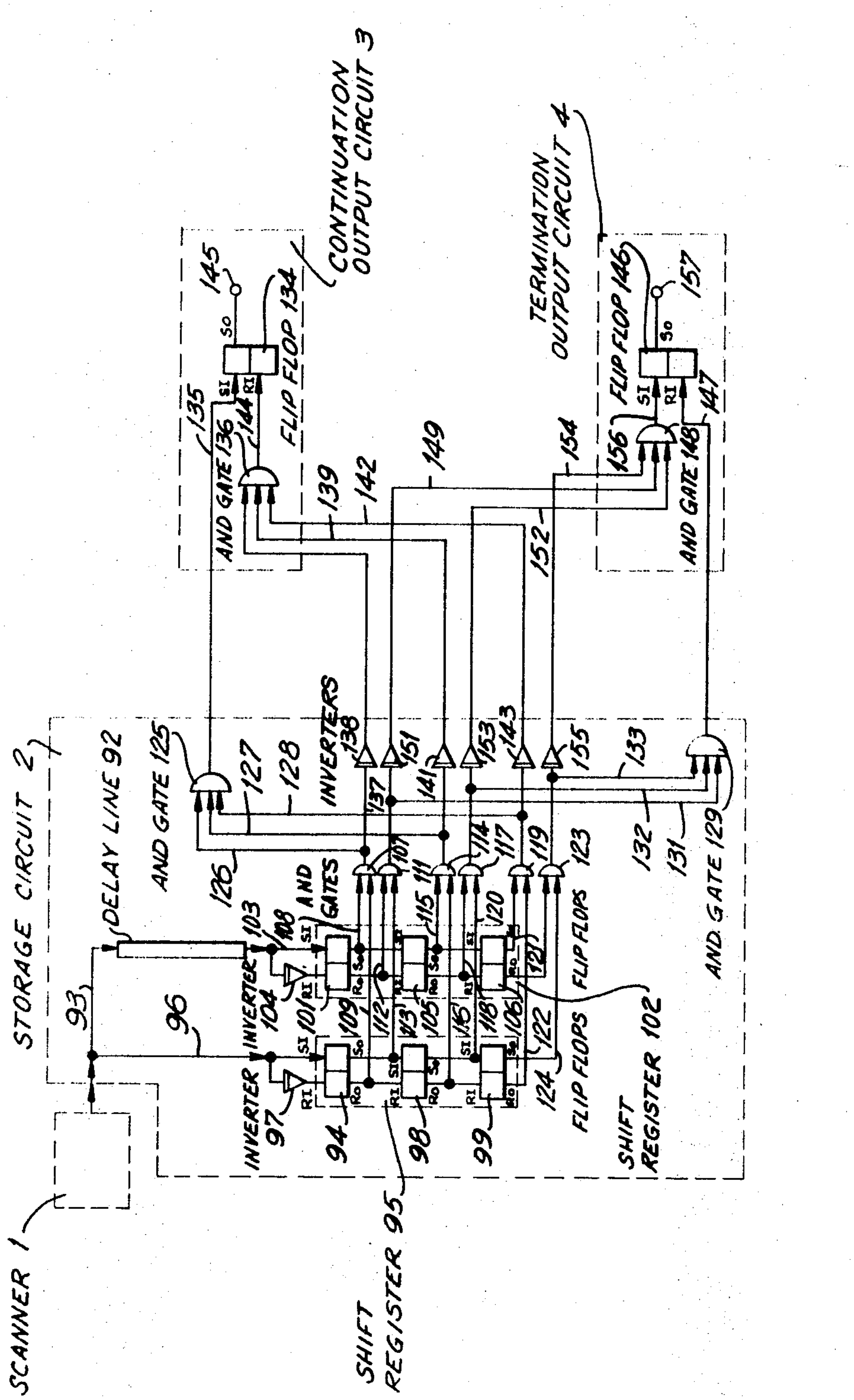
Figure 12:
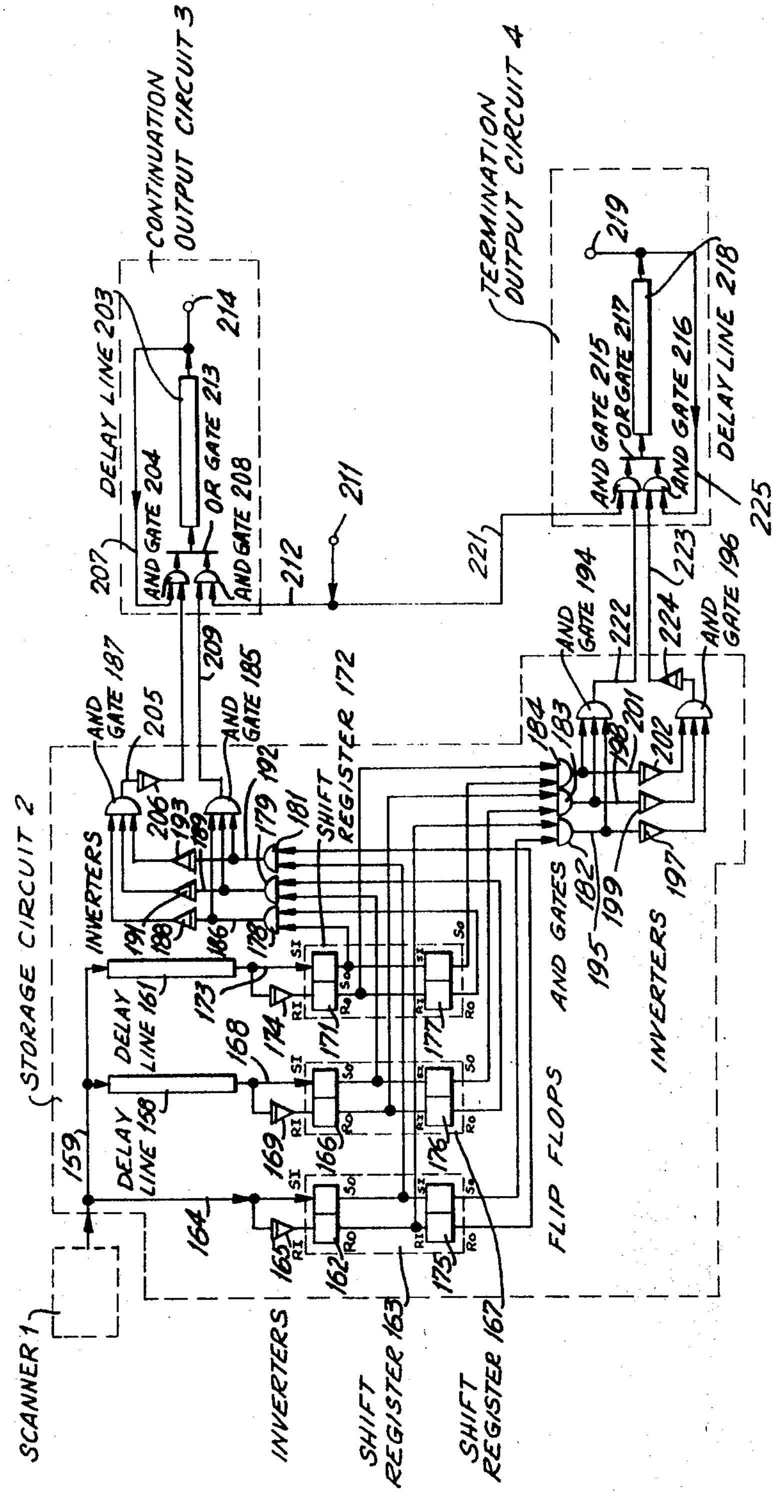

FIGS. 4*a* and 4*b* are schematic diagrams of a pattern analyzed by the line-determining circuit of the present invention and illustrate ascending characteristics and descending characteristics;

FIGS. 5*a* and 5*b* are schematic diagrams of another pattern which may be analyzed by the line-determining circuit of the present invention and illustrate ascending and descending characteristics;

FIG. 6 is a circuit diagram of a simplified ascending and descending portion in a horizontal direction detecting circuit;

FIG. 7 is a circuit diagram of a simplified ascending and descending portion in a vertical direction detecting circuit;

FIGS. 8*a*, 8*b* and 8*c* are schematic diagrams illustrating a method for determining vertical and horizontal lines or strokes from various lines or strokes of a pattern;

FIGS. 9*a* and 9*b* are schematic diagrams of patterns illustrating the defect of known line-determining circuits;

FIGS. 10*a* and 10*b* are schematic diagrams of patterns illustrating the high precision results obtained by the line-determining circuit of the present invention;

FIG. 11 is a circuit diagram of an embodiment of the line-determining circuit of the present invention for deriving a vertical line component; and FIG. 12 is a circuit diagram of an embodiment of the line-determining circuit of the present invention for deriving a horizontal line component.

Figure 1:
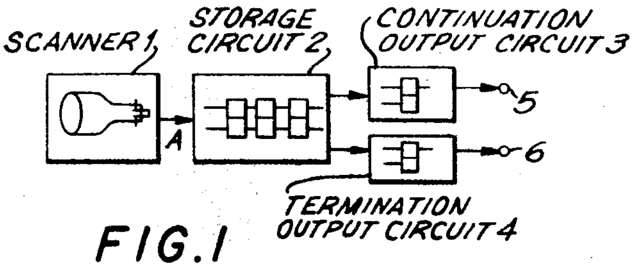
FIG. 1 is a block diagram of an embodiment of the line-determining circuit of the present invention.

In FIG. 1, a pattern or character, not shown in FIG. 1, is scanned by a scanner 1. The scanner 1 may comprise any suitable scanning apparatus such as, for example, that utilized in a television transmission system. The scanner produces scanning signals or pattern output signals A in accordance with the pattern scanned.

The scanning signals produced by the scanner 1 are supplied to a storage circuit 2. The storage circuit 2 stores the scanning signals for a determined period of time and determines from the stored signals the complete continuity and the noncontinuity of specific slope components of lines of the pattern and the complete termination and the nontermination of such specific slope components.

A continuation output circuit 3 is connected to one part of the storage circuit 2 and indicates the complete continuity and noncontinuity of the specific slope components of the lines of the pattern. A termination output circuit 4 is connected to another part of the storage circuit 2 and indicates the complete termination and nontermination of the specific slope components of the lines of the pattern. A signal provided at an output terminal 5 indicates the continuity or noncontinuity of a specific slope component and a signal provided at an output terminal 6 indicates the termination or nontermination of such slope component.

Figure 2:
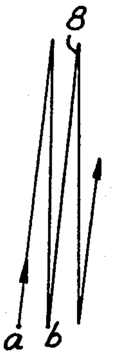
FIG. 2 is a schematic diagram of a scanning pattern.
Figure 3:
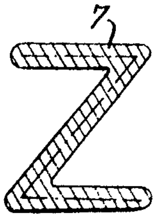
FIG. 3 is a schematic diagram of a pattern or character which may be analyzed by the line-determining circuit of the present invention.

The pattern or character 7 of FIG. 3 may be scanned by the scanning line or pattern 8 of FIG. 2. The scanning apparatus may comprise a flying spot tube having high resolution and a photomultiplier tube or such apparatus may comprise a plurality of photocells positioned in a straight line and electrically switched at high speed by a known method.

FIG. 4*a* discloses ascending scanning signals relative to the direction of scanning and FIG. 4*b* discloses descending scanning signals relative to said direction of scanning. FIG. 5*a* discloses ascending scanning signals relative to a direction at right angles to the direction of scanning and FIG. 5*b* discloses descending scanning signals relative to such right-angle direction. In FIG. 4*a*, the portions 9 ascend relative to the direction of scanning and in FIG. 4*b*, the portions 11 descend relative to said direction of scanning. The direction of scanning 4*a* and 4*b* is vertical. In FIG. 5*a*, the portions 12 ascend relative to a direction of scanning and in FIG. 5*b* the portions 13 descend elative o said right-angle direction. The direction of scanning is horizontal.

The aforedescribed signals may be derived by the circuits of FIGS. 6 and 7. The circuit of FIG. 6 determines ascendancy and descendancy in the horizontal direction of the circuit of FIG. 7 determines ascendancy and descendancy in the vertical direction. In FIG. 6, a delay line 14 has a delay time equal to an integral number of times the period of time required for a single scanning cycle, that is, for moving from the point *a* to the point *b* in FIG. 2. The delay time is thus equal to a period of time required for a single scanning operation.

The scanning signals are supplied to the circuit of FIG. 6 via an input terminal 15. The input terminal 15 is connected to the input of the delay line 14 via a lead 16, is connected to an input of an AND gate 17 via a lead 18 and a lead 19, and is connected to an input of an AND gate 21 via the leads 16 and 18, a lead 22 and an inverter 23. The output of the delay line 14 is connected to the other input of the AND gate 17 via a lead 24, a lead 25 and an inverter 26, and is connected to the other input of the AND gate 21 via the lead 24 and a lead 27. The output of the AND gate 17 is provided at an output terminal 28 and the output of the AND gate 21 is provided at an output terminal 29.

Each of the inverters 23 and 26 is a known type of inverter which functions in a known manner to convert a logical 1 signal to a logical 0 signal and to convert a logical 0 signal to a logical 1 signal. Each of the AND gates 17 and 21 is a known AND gate or coincidence gate and functions in a known manner to transfer an input signal only when there is an input signal 1 supplied to each of its inputs.

It is a determined that the scanning signal is 1 when the scanning point is in a black area, such as a part of a portion of the scanned pattern or character, and the scanning signal is 0 when the scanning point is in a white or blank area, such as an area in which a portion or part of the pattern or character does not appear. An output signal of 1 is provided at the output terminal 28 only when the scanning point varies from white to black in scanning from left to right. An output signal of 1 is provided at the output terminal 29 only when the scanning point changes from black to white in scanning from left to right. The variation from white to black is illustrated by the portions 12 in FIG. 5*a* and the variation from black to white is illustrated by the portions 13 in FIG. 5*b*.

In FIG. 7, the scanning signals are supplied to an input terminal 31. The input terminal 31 is connected to the set input of a flip-flop 32 of a shift register 33 via a lead 34, and is connected to the reset input of said flip-flop via the lead 34, a lead 35 and an inverter 36. The shift register 33 comprises a second flip-flop 37. The set output of the flip-flop 32 is connected to the set input of the flip-flop 37 via a lead 38 and is connected to an input of an AND gate 39 via the lead 38 and a lead 41.

The reset output of the flip-flop 32 is connected to the reset input of the flip-flop 37 via a lead 42 and is connected to an input of an AND gate 43 via the lead 42 and a lead 44. The set output of the flip-flop 37 is connected to the other input of the AND gate 43 via a lead 45. The reset output of the flip-flop 37 is connected to the other input of the AND gate 39 via a lead 46. An output terminal 47 is connected to the output of the AND gate 43 and an output 48 is connected to the output of the AND gate 39.

When a scanning signal is supplied to the input terminal 31, such signal is advanced by one step in the shift register 33 each time a scanning operation is completed by one step in the vertical direction, that is, from point *a* to point *b* in FIG. 2. As hereinbefore described, it is determined that the scanning signal is 1 when the scanning point is in a black area and the scanning signal is 0 when the scanning point is in a white or blank area. Therefore, if it is assumed, for example, that the scanning point is in a white area, the set output of the flip-flop 32 is 0 and the reset output of said flip-flop is 1.

When the scanning point varies from white to black, the set output of the flip-flop 32 changes to 1 and the reset output of said flip-flop changes to 0. At such instant, the former 0 output signal in the lead 38 and the former 1 output signal in the lead 42 are advanced by one step to the flip-flop 37 of the next stage of the shaft register 33, so that the set output of the flip-flop 37 becomes 0 and the reset output of said flip-flop becomes 1. At such instant, the signal in the lead 38 is 1 and the signal in the lead 46 is 1. At such instant, both input signals to the AND gate 39 are 1, so that said AND gate transfers a 1 signal to its output, which signal is provided at the output terminal 48.

An output signal of 1 is thus provided at the output terminal 48 when the scanning point varies from white to black in moving from under to over, as shown by the portions 9 of FIG. 4*a*. An output signal of 1 is provided at the output terminal 47 when the scanning point varies from black to white in moving from under to over, as shown by the portions 11 of FIG. 4*b*. It is thus seen that the portions or edges 9, 11, 12 and 13 of the patterns or characters may be classified in accordance with their slopes by utilizing four types of signals which characterize the edge of said patterns. The four types of signals are those provided at the output terminals 28 and 29 of FIG. 6 and the output terminals 47 and 48 of FIG. 7.

Another feature of the present invention is that only horizontal and vertical lines may be derived from various slope or oblique line components by suitable control of the scanning signals. When a slope or oblique line component 49 of the pattern of FIG. 4*a* is eliminated from the vertical ascending signals for the portions 9, only the horizontal line components 51 and 52 remain. The same principle may be applied to vertical descending signals corresponding to the components or lines 53, 54 and 55 of FIG. 4*b*. Similarly, in FIGS. 5*a* and 5*b*, if the slopes or oblique line components 56, 57, 58 and 59 are eliminated from the horizontal ascending signals corresponding to the portions 12 and from the horizontal descending signals corresponding to the portions 13, only the vertical line components 61 and 62 remain. In order to eliminate the oblique line components, it is necessary to determine the continuity of the signal relating to the direction of the line to be detected. In other words, the continuity of the signals relating to the lines 3 and 4 of FIGS. 4*a* and 4*b* in the horizontal direction must be determined and the continuity of the signals relating to the lines 12 and 13 of FIGS. 5*a* and 5*b* in the vertical direction must be determined.

Scanning signals relating to slope or oblique line components do not continue long in vertical and horizontal directions. This fact is utilized in the present invention to eliminate the oblique line components, as illustrated in FIGS. 8*a*, 8*b* and 8*c*. In FIG. 8*a*, an observation window 63 is passing the lower edge of a horizontal line 64 of a pattern. The observation window 63 may be divided, for example, into six sectors 65, 66, 67, 68, 69 and 71. If it is determined that the upper three sectors 65, 66 and 67 are all black and the lower three sectors 68, 69 and 71 are all white, the oblique line component of the scanning signals related to the lines 9 of FIG. 4*a* will be eliminated.

In FIG. 8*b*, an observation window 72 is passing the left edge of a vertical line 73 of a pattern. The observation window 63 is divided into six sectors 74, 75, 76, 77, 78 and 79. If it is determined that the left three sectors 74, 75 and 76 are all white and the right three sectors are all black, the oblique line component of the scanning signals related to the lines 12 of FIG. 5*a* will be eliminated.

FIG. 8*c* shows that the aforedescribed condition cannot be satisfied when an observation window is passing along an edge of an oblique line 81 of a pattern. Observation windows 82 and 83 are shown passing along the over and under edges of the oblique line 81. An observation window is provided electronically by logical circuit elements, as hereinafter described.

As shown in FIGS. 9*a* and 9*b*, the scanning signals corresponding to certain areas of the lines of the pattern are incomplete. This is evident at the areas 84 and 85 of FIGS. 9*a* and 9*b*, respectively. Information at these areas is therefore lost, due to the irregular variation of the edge of the line. This is related to the length of the observation window illustrated in FIGS. 8*a*, 8*b* and 8*c*. In the case of FIGS. 8*a*, 8*b* and 8*c*, the length of the observation window is determined by the three photocells. If the length of the observation window is increased, it is possible to eliminate the oblique line component effectively. However, as is readily seen, many determined signals will be lacking, such as represented by the voids 84 and 85 of the lines 86 and 87, respectively, of FIGS. 9*a* and 9*b*. This disadvantage is eliminated by the circuit of the present invention.

In accordance with the present invention, the oblique line component is effectively eliminated without creating deficiencies in the scanning or derived signals. FIG. 10*a* discloses horizontal line-determining signals 88 and 89 provided by the circuit of the present invention. FIG. 10*b* discloses vertical line-determining signals 91 provided by the circuit of the present invention.

Oblique line components are noise components cannot be satisfactorily eliminated if the observation window of FIGS. 8*a*, 8*b* and 8*c* is too short in length. It is therefore a feature of the present invention to provide a circuit which compensates for the deficiency of signal components caused by a long observation window. The basic principle of the compensating circuit of the present invention is that a line is assumed to continue until the end of the line is determined, if the line extends in a specific direction and is determined with efficient precision. FIG. 11 discloses a circuit for determining vertical lines and FIG. 12 discloses a circuit for determining horizontal lines.

In FIG. 11, the scanning signals are supplied from the scanner 1 to the storage circuit 2, as in FIG. 1. The circuit of FIG. 11 may be utilized as that of the storage circuit 2 of FIG. 1. The continuation output circuit 3 of FIG. 1 is connected to specific components of the storage circuit 2 and the termination output circuit 4 of FIG. 1 is connected to other specific components of said storage circuit. In FIG. 12, the storage circuit 2 is connected to the scanner 1, as in FIG. 1, and such storage circuit may be utilized as the storage circuit of FIG. 1. The continuation output circuit 3 and the termination output circuit 4 are connected to corresponding specific components of the storage circuit 2. The circuitry of the storage circuit 2, the continuation output circuit 3 and the termination output circuit 4 is different in each of FIGS. 11 and 12.

In FIG. 11, the scanning signals from the scanner 1 are supplied to the input of a delay line 92 via a lead 93 and are supplied to the set input of a flip-flop 94 of a shift register 95 via the lead 93 and a lead 96. The scanning signals from the scanner 1 are also supplied to the reset input of the flip-flop 94 via the leads 93 and 96 and an inverter 97. The shift register 95 further comprises a flip-flop 98 and a flip-flop 99. The set output of the flip-flop 94 is connected to the set input of the flip-flop 98 and the set output of the flip-flop 98 is connected to the set input of the flip-flop 99. The reset output of the flip-flop 94 is connected to the reset input of the flip-flop 98 and the reset output of the flip-flop 98 is connected to the reset input of the flip-flop 99.

The output of the delay line 92 is connected to the set input of the flip-flop 101 of a shift register 102 via a lead 103 and to the reset input of said flip-flop via the lead 103 and an inverter 104. The shift register 102 further comprises a flip-flop 105 and a flip-flop 106. The set output of the flip-flop 101 is connected to the set input of the flip-flop 105 and the set output of the flip-flop 105 is connected to the set input of the flip-flop 106. The reset output of the flip-flop 101 is connected to the reset input of the flip-flop 105 and the reset output of the flip-flop 105 is connected to the reset input of the flip-flop 106.

The set output of the flip-flop 101 is connected to an input of an AND gate 107 via a lead 108. The reset output of the flip-flop 94 is connected to the other input of the AND gate 107 via a lead 109. The reset output of the flip-flop 101 is connected to an input of an AND gate 111 via a lead 112. The set output of the flip-flop 94 is connected to the other input of the AND gate 111 via a lead 113. The set output of the flip-flop 105 is connected to an input of an AND gate 114 via a lead 115. The reset output of the flip-flop 98 is connected to the other input of the AND gate 114 via a lead 116. The reset output of the flip-flop 105 is connected to an input of an AND gate 117 via a lead 118. The set output of the flip-flop 98 is connected to the other input of the AND gate 117. The set output of the flip-flop 106 is connected to an input of an AND gate 119 via a lead 121. The reset output of the flip-flop 99 is connected to the other input of the AND gate 119 via a lead 122. The reset output of the flip-flop 106 is connected to an input of an AND gate 123. The set output of the flip-flop 99 is connected to the other input of the AND gate 123 via a lead 124.

The output of the AND gate 107 is connected to an input of an AND gate 125 via a lead 126. The output of the AND gate 114 is connected to a second input of the AND gate 125 via a lead 127. The output of the AND gate 119 is connected to a third input of the AND gate 125 via a lead 128. The output of the AND gate 129 is connected to an input of an AND gate 129 via a lead 131. The output of the AND gate 117 is connected to a second input of the AND gate 129 via a lead 132. The output of the AND gate 123 is connected to the third input of the AND gate 129 via a lead 133.

The continuation output circuit 3 comprises a flip-flop 134. The output of the AND gate 125 of the storage circuit 2 is connected to the set input of the flip-flop 134 via a lead 135. The continuation output circuit 3 further comprises an AND gate 136, The output of the AND gate 107 of the storage circuit 2 is connected to an input of the AND gate 136 via a lead 137 and an inverter 138. The output of the AND gate 114 of the storage circuit 2 is connected to a second input of the AND gate 136 via a lead 139 and an inverter 141. The output of the AND gate 119 of the storage circuit 2 is connected to a third input of the AND gate 136 via a lead 142 and an inverter 143. The output of the AND gate 136 is connected to the reset input of the flip-flop 134 via a lead 144. An output terminal 145 is connected to the set output of the flip-flop 134.

The termination output circuit 4 comprises a flip-flop 146. The output of the AND gate 129 of the storage circuit 2 is connected to the reset input of the flip-flop 146 via a lead 147. The termination output circuit 4 further comprises an AND gate 148. The output of the AND gate 111 of the storage circuit 2 is connected to an input of the AND gate 148 via a lead 149 and an inverter 151. The output of the AND gate 117 of the storage circuit 2 is connected to a second input of the AND gate 148 via a lead 152 and an inverter 153. The output of the AND gate 123 of the storage circuit 2 is connected to a third input of the AND gate 148 via a lead 149 and an inverter 151. The output of the AND gate 117 of the storage circuit 2 is connected to a second input of the AND gate 148 via a lead 152 and an inverter 153. The output of the AND gate 123 of the storage circuit 2 is connected to a third input of the AND gate 148 via a lead 154 and an inverter 155. The output of the AND gate 148 is connected to the set input of the flip-flop 146 via a lead 156. An output terminal 157 is connected to the set output of the flip-flop 146.

Output signals provided at the output terminal 145 indicate the condition of the continuity of vertical lines at which white is changed to black. Output signals provided at the output terminal 157 indicate the condition of continuity of vertical lines at which black is changed to white. The delay line 92 has a delay time of one scanning cycle, that is, the period of time required to scan from the point *a* to the point *b* in FIG. 2. The AND gates 107, 114 and 119 from each of the three stages of each of the shift registers 95 and 102, indicate the determination of the variation from white to black when the pattern is scanned from left to right. The AND gates 111, 117 and 123 indicate the variation from black to white.

There is thus a determination output signal provided by the AND gate 125 when there are three continuous portions of a line in the vertical direction when white is changed to black and the pattern is scanned from left to right. There is a determination output signal provided by the AND gate 129 when there are three continuous portions of a line in the vertical direction when black is changed to white. The determination output signals provided by the AND gates 125 and 129 indicate that the vertical line is continuing with sufficient precision. On the other hand, however, inhibit signals of inputs supplied to the AND gates 125 and 129 are supplied to the AND gates 136 and 148, so that the AND gates 136 and 148 indicate that the vertical line is sufficiently terminated. This is due to the fact that for each logical 1 signal supplied to either of the AND gates 125 and 129, a logical 0 signal is supplied to the corresponding one of the AND gates 136 and 148.

It is therefore possible, by setting and resetting the flip-flops 134 and 146 by utilizing the output signals of the AND gates 125 and 129 as the starting signals of the vertical line and by utilizing the output of the AND gates 136 and 148 as the terminating signals of the vertical line, to eliminate voids of the type of the void 85 shown in FIG. **9*b* and to provide vertical line-determining signals having no voids or breaks therein at the output terminal 145. A vertical line-determining signal having no break therein is illustrated as the line 91 of FIG. 10*b*. The same principles of operation apply to the determination of the output signal provided at the output terminal 157**.

In FIG. 12, scanning signals from the scanner 1 are supplied to the input of a delay line 158 via a lead 159, to the input of a delay line 161 via said lead, and to the set input of a flip-flop 162 of a shift register 163 via the lead 159 and a lead 164. The scanning signals are also supplied to the reset input of the flip-flop 162 via the leads 159 and 164 and an inverter 165.

The output of the delay line 158 is supplied to the set input of a flip-flop 166 of a shift register 167 via a lead 168 and to the reset input of said flip-flop via said lead and an inverter 169. The output of the delay line 161 is connected to the set input of a flip flop 171 of a shift register 172 via a lead 173 and to the reset input of said flip-flop via said lead and an inverter 174.

The shift register 163 comprises a second flip-flop 175. The set output of the flip-flop 162 is connected to the set input of the flip-flop 175 and the reset output of the flip-flop 162 is connected to the reset input of the flip-flop 175. The shift register 167 comprises a second flip flop 176. The set output of the flip-flop 166 is connected to the set input of the flip-flop 176 and the reset output of the flip-flop 166 is connected to the reset input of the flip-flop 176. The shift register 172 further comprises a second flip-flop 177. The set output of the flip-flop 171 is connected to the set input of the flip-flop 177 and the reset output of the flip-flop 171 is connected to the reset input of the flip-flop 177.

The set output of the flip-flop 171 is connected to an input of an AND gate 178. The reset output of the flip-flop 177 is connected to the other input of the and gate 178. The set output of the flip-flop 166 is connected to an input of an AND gate 179. The reset output of the flip-flop 176 is connected to the other input of the AND gate 179. The set output of the flip-flop 162 is connected to an input of an AND gate 181. The reset output of the flip-flop 175 is connected to the other input of the AND gate 181.

The set output of the flip-flop 175 is connected to an input of an AND gate 182. The reset output of the flip-flop 162 is connected to the other input of the AND gate 182. The set output of the flip-flop 176 is connected to an input of an AND gate 183. The reset output of the flip-flop 166 is connected to the other input of the AND gate 183. The set output of the flip-flop 177 is connected to an input of an AND gate 184. The reset output of the flip-flop 171 is connected to the other input of the AND gate 184.

The output of the AND gate 178 is connected to an input of an AND gate 185 via a lead 186 and is connected to an input of an AND gate 187 via said lead and an inverter 188. The output of the AND gate 179 is connected to a second input of the AND gate 185 via a lead 189 and is connected to a second input of the AND gate 187 via said lead and an inverter 191. The output of the AND gate 181 is connected to a third input of the AND gate 185 via a lead 192 and is connected to a third input of the AND gate 187 via said lead and an inverter 193.

The output of the AND gate 182 is connected to an input of an AND gate 194 via a lead 195 and is connected to an input of an AND gate 196 via said lead and an inverter 197. The output of the AND gate 183 is connected to a second input of the AND gate 194 via a lead 198 and is connected to a second input of the AND gate 196 via said lead and an inverter 199. The output of the AND gate 184 is connected to a third input of the AND gate 194 via a lead 201 and is connected to a third input of the AND gate 196 via said lead and an inverter 202.

The continuation output circuit 3 comprises a delay line 203. The output of the AND gate 187 of the storage circuit 2 is connected to an input of an AND gate 204 of the continuation of the output circuit 3 via a lead 205 and an inverter 206. A feedback line 207 is connected from the output of the delay line 203 to the other input of the AND gate 204. The output of the AND gate 185 of the storage circuit 2 is connected to an input of an AND gate 208 via a lead 209. The AND gate 208 is included in the continuation output circuit 3. An input terminal 211 is connected to the other input of the AND gate 208 via a lead 212. The outputs of the AND gates 204 and 208 are connected as inputs of an OR gate 213. The output of the OR gate 213 is connected to the input of the delay line 203. The output terminal 214 is connected to the output of the delay line 203.

The termination output circuit 4 comprises a pair of AND gates 215 and 216, an OR gate 217 and a delay line 218. The outputs of the AND gates 215 and 216 are connected as inputs to the OR gate 217. The output of the OR gate 217 is connected to the input of the delay line 218. An output terminal 219 is connected to the output of the delay line 218. The input terminal 211 is connected to an input of the AND gate 215 via a lead 221. The output of the AND gate 194 of the storage circuit 2 is connected to the other input of the AND gate 215 via a lead 222. The output of the AND gate 196 of the storage circuit 2 is connected to an input of the AND gate 216 via a lead 223 and an inverter 224. A feedback lead 225 is connected between the output of the delay line 218 and the other input of the AND gate 216.

The output signals provided at the output terminal 214 indicate the condition of continuity of horizontal lines at which white is changed to black. Output signals are provided at the output terminal 219 which indicate the condition of continuity of horizontal lines at which black is changed to white. The delay line 158 has a delay time equal to one scanning period, from the point *a* to the point *b* in FIG. 2. The delay line 161 has a delay time equal to two scanning periods. The AND gates 178, 179 and 181 provide determination outputs which indicate the variation from white to black when the pattern is scanned from under to over. The AND gates 182, 183 and 184 provide determination outputs which indicate the variation from black to white when the pattern is scanned from under to over.

A logical 1 signal is thus provided by the AND gate 185 when there are three continuous portions of a line in the horizontal direction when white is changed to black and the pattern is scanned from under to over. A logical 1 signal is provided by the AND gate 194 when there are three continuous portions of a line in the horizontal direction when black is changed to white and the pattern is scanned from under to over. These determination signals indicate that the horizontal line is continuing sufficiently. Since the input signals to the AND gates 187 and 196 are inhibit signals of the input signals to the AND gates 185 and 194, respectively, the signals provided by the AND gates 187 and 196 indicate that the horizontal line is sufficiently terminated. This is due to the fact that each signal supplied from the AND gates 178, 179, and 181 to the AND gate 185 is provided as the inverse signal to the AND gate 187 and each signal supplied from the AND gates 182, 183 and 184 to the AND gate 194 is supplied as the inverse signal to the AND gate 196.

The delay line 203 has a delay time of one scanning period, as does the delay line 218. A logical 1 signal is supplied to the input terminal 211 when the scanning point is on the pattern. Thus, while one scanning period passes after the signal from the AND gate 185 is transferred by the delay line 203, the output of said delay line is supplied to an input of the AND gate 204. Therefore, when the AND gate 187 transfers no output signal, the signal in the delay line 203 circulates. When the AND gate 187 indicates that the horizontal line is sufficiently terminated, the signal in the delay line 203 is eliminated by the AND gate 204 and no longer circulates.

The signal supplied to the input terminal 211 is a 0 logical signal in the black or white area not occupied by the pattern. The signals in the delay 203 are then removed. The termination output circuit 4 functions in the same manner as described for the continuation output circuit 3.

The observation window does not constitute a photocell. As shown in FIGS. 11 and 12, the observation window comprises the shift register or the delay line. Thus, for example, the sectors 65, 66 and 67 of the observation window 63 in FIG. 8*a* correspond to the flip-flops 162, 166, 171 (FIG. 12) and the sectors 68, 69 and 71 correspond to the flip-flops 175, 176 and 177 (FIG. 12). Furthermore, the sectors 74, 75 and 76 of the observation window 72 of FIG. 8*b* correspond to the flip-flops 94, 98, 99 (FIG. 11) and the sectors 77, 78 and 79 correspond to the flip-flops 101, 105 and 106 (FIG. 11).

In the foregoing disclosure it is assumed that three signals are utilized to determine the start and termination of a line. However, this length must be suitably selected in accordance with the condition of scanning and the condition of the pattern scanned. If four signals are utilized, for example, additional flip-flops must be provided in an additional stage of FIG. 11. In this case, in FIG. 12, it would be necessary to add another shift register and to apply the scanning signals to the additional shift register through a delay line having a delay time of three scanning periods.

In the FIGS., the set input of each flip-flop is labeled SI, the reset input is labeled RI, the set output is labeled SO and the reset output is labeled RO. When a signal is supplied to the set input SI, a logical 1signal is provided at the set output SO and a logical 0 signal is provided at the reset output RO. When a signal is supplied to the reset input RI, a logical 0 signal is provided at the set output SO and a logical 1 signal is provided at the reset output RO.

While the invention has been described by means of specific examples and in specific embodiments, I do not wish to be limited thereto, for obvious modifications will occur to those skilled in the art without departing from the spirit and scope of the invention.

I claim:

1. In a pattern-indicating circuit, a line-determining circuit for determining the continuity of lines of said pattern, said line-determining circuit comprising scanning means for scanning a pattern comprising a plurality of lines and producing scanning signals in accordance with said patterns; storage means connected to said scanning means for storing said scanning signals and for providing from said scanning signals line signals for lines of said pattern having specific slope components, said storage means comprising continuation means for determining the complete continuity and the noncontinuity of the specific slope components of the vertical lines of said pattern, the continuation means of said storage means comprising a first shift register having input and output means comprising a first shift register having input and output means and comprising a plurality of flip-flops, each having a set input, a reset input, a set output and a reset output, said storage means further comprising termination means for determining the complete termination and the nontermination of the specific slope components of the vertical lines of said pattern, said termination means comprising a plurality of flip-flops, each having a set input, a reset input, a set output and a reset output, said storage means comprising a delay line and input means connecting said scanning means to the input means of said first shift register and connecting said scanning means to the input means of said second shift register via said delay line, a first plurality of AND gates each having an output, an input connected to the reset output of a corresponding flip-flop of said first shift register and another input connected to the set output of the corresponding flip-flop of said second shift register, and a second plurality of AND gates each having an output, an input connected to the set output of a corresponding flip-flop of said first shift register and another input connected to the reset output of the corresponding flip-flop of said second shift register; continuation output means connected to the continuation means of said storage means for indicating said complete continuity and noncontinuity; and termination output means connected to the termination means of said storage means for indicating said complete termination and nontermination.

2. In a pattern-indicating circuit, a line-determining circuit for determining the continuity of lines of said pattern, said line-determining circuit comprising scanning means for scanning a pattern comprising a plurality of lines and producing scanning signals in accordance with said pattern; storage means connected to said scanning means for storing said scanning signals and for providing from said scanning signals line signals for lines of said pattern having specific slope components, said storage means comprising continuation means for determining the complete continuity and the noncontinuity of the specific slope components of the horizontal lines of said pattern, the continuation means of said storage means comprising a first shift register having input and output means and comprising a pair of flip-flops each having a set input, a reset input, a set output and a reset output, and a second shift register having input and output means and comprising a pair of flip-flops each having a set input, a reset input, a set output and a reset output, said storage means further comprising termination means for determining the complete termination and the nontermination of the specific slope components of the horizontal lines of said pattern, said termination means comprising said second shift register and a third shift register having input and output means and comprising a pair of flip-flops each having a set input, a reset input, a set output and a reset output, said storage means comprising a first delay line having a first delay time, a second delay line having a second delay time longer than the first delay time, and input means connecting said scanning means to input means of said first register, connecting said scanning means to the input means of said second shift register via said first delay line and connecting said scanning means to the input means of said third shift register via said second delay line, a first plurality of AND gates each having an output, an input connected to the set output of the first flip-flop of a corresponding one of said shift registers and another input connected to the reset output of the second flip-flop of the corresponding one of said shift registers, and a second plurality of AND gates each having an output, an input connected to the reset output of the first flip-flop of a corresponding one of said shift registers and another input connected to the set output of the second flip-flop of the corresponding one of said shift registers; continuation output means connected to the continuation means of said storage means for indicating said complete continuity and noncontinuity; and termination output means connected to the termination means of said storage means for indicating said complete termination and nontermination.

3. In a pattern-indicating circuit as claimed in claim 1, wherein said continuation output means comprises a flip-flop having a set input, a reset input, a set output and a reset output, and an AND gate having a plurality of inputs and an output connected to the reset input of said flip-flop, and wherein said storage means further comprises an AND gate having a plurality of inputs each connected to the output of a corresponding one of the first plurality of AND gates and an output connected to the set input of the flip-flop of said continuation output means and a plurality of inverters each connected between the output of a corresponding one of said first plurality of AND gates and a corresponding one of the inputs of the AND gate of said continuation output means whereby the flip-flop of said continuation output means is set when each of the AND gates of said first plurality of AND gates is in conductive condition and is reset when each of the AND gates of said first plurality of AND gates is in nonconductive condition thereby indicating the complete continuity and the noncontinuity of the specific slope components of the vertical lines of said pattern, and output means connected to the set output of the flip-flop of said continuation output means.

4. In a pattern-indicating circuit as claimed in claim 1, wherein said termination output means comprises a flip-flop having a set input, a reset input, a set output and a reset output and an AND gate having a plurality of inputs and an output connected to the set input of said flip-flop and wherein said storage means further comprises an AND gate having a plurality of inputs each connected to the output of a corresponding one of the second plurality of AND gates and an output connected to the reset input of the flip-flop of said termination output means and a plurality of inverters each connected between the output of a corresponding one of said second plurality of AND gates and a corresponding one of the inputs of the AND gate of said termination output means whereby the flip-flop of said termination output means is set when each of the AND gates of said second plurality of AND gates and a corresponding one of the inputs of the AND gate of said termination output means whereby flip-flop of said termination output means is set when each of the AND gates of said second plurality of AND gates is in conductive condition thereby indicating the complete termination and the nontermination of the specific slope components of the vertical lines of said pattern, and output means connected to the set output of the flip-flop of said termination output means.

5. In a pattern-indicating circuit as claimed in claim 1, wherein each of said first and second shift registers comprises three flip-flops.

6. In a pattern-indicating circuit as claimed in claim 1, wherein said delay line has a delay time equal to one scanning period of said scanning means.

7. In a pattern-indicating circuit as claimed in claim 2, wherein said continuation output means comprises a circulating-type delay line having a delay time equal to one scanning period, an input and an output, first and second AND gates each having a pair of inputs and an output and an OR gate having a pair of inputs each connected to the output of a corresponding one of the first and second AND gates and an output connected to the input of said circulating-type delay line, the output of said circulating-type delay line being connected to an input of said first AND gate, and wherein said storage means further comprises a first AND gate having a plurality of inputs each connected to the output of a corresponding one of the first plurality of AND gates and an output connected to an input of the second AND gate of said continuation output means, a second AND gate having a plurality of inputs and an output, a plurality of inverters each connected between the output of a corresponding one of said first plurality of AND gates and a corresponding corresponding input of said second AND gate and an inverter connected between the output of said second AND gate and the other input of the first AND gate of said continuation output means, means for supplying scanning signals to the other input of the second AND gate of said continuation output means, and output means connected to the output of said circulating type delay line.

8. In a pattern-indicating circuit as claimed in claim 2, wherein said termination output means comprises a circulating-type delay line having a delay time equal to one scanning period, an input and an output, first and second AND gates each having a pair of inputs and an output and an OR gate having a pair of inputs each connected to the output of a corresponding one of the first and second AND gates and an output connected to the input of said circulating-type delay line, the output of said circulating-type delay line being connected to an input of said first AND gate, and wherein said storage means further comprises a first AND gate having a plurality of inputs each connected to the output of a corresponding one of the second plurality of AND gates and an output connected to an input of the second AND gate of said termination output means, a second AND gate having a plurality of inputs and an output, a plurality of inverters each connected between the output of a corresponding one of said second plurality of AND gates and a corresponding input of said second AND gate and an inverter connected between the output of said second AND gate and the other input of the first AND gate of said termination output means, means for supplying scanning signals to the other input of the second AND gate of said termination output means, and output means connected to the output of said circulating-type delay line.

9. In a pattern-indicating circuit as claimed in claim 2, wherein said first delay line has a delay time equal to one scanning period of said scanning means and said second delay line has a delay time equal to two scanning periods of said scanning means.